United States Patent [19]
Fuhrer

[11] Patent Number: 5,955,945
[45] Date of Patent: Sep. 21, 1999

[54] FAIL SAFE SYSTEM FOR PROVIDING WARNING SIGNALS UPON THE FAILURE OF MOTORCYCLE BRAKE OR TAIL LIGHTS

[76] Inventor: Kenneth Fuhrer, 10480 Sunland Blvd., #33, Sunland, Calif. 91040

[21] Appl. No.: 08/960,709

[22] Filed: Oct. 30, 1997

Related U.S. Application Data

[63] Continuation-in-part of application No. 08/499,848, Jul. 10, 1995, abandoned.

[51] Int. Cl.$^6$ ...................................................... B60Q 1/44
[52] U.S. Cl. ......................... 340/479; 340/458; 340/642; 307/10.8; 315/77; 315/88; 315/92; 315/93
[58] Field of Search ..................................... 340/479, 458, 340/475, 641, 642, 468, 469, 471, 472; 307/10.8; 315/77, 130, 131, 132, 133, 88, 92, 93

[56] References Cited

U.S. PATENT DOCUMENTS

| | | | |
|---|---|---|---|
| 2,342,639 | 2/1944 | Bradley | 340/458 |
| 2,528,245 | 10/1950 | Riggins | 340/458 |
| 3,076,123 | 1/1963 | McDermott | 340/458 |
| 3,825,769 | 7/1974 | Alford, Jr. | 307/10.8 |
| 3,883,777 | 5/1975 | Morita | 340/458 |
| 4,213,075 | 7/1980 | Ericson | 307/10.8 |
| 4,222,047 | 9/1980 | Finnegan | 340/458 |
| 4,380,718 | 4/1983 | Miller | 340/458 |
| 4,910,496 | 3/1990 | Hatanaka et al. | 340/458 |
| 4,972,174 | 11/1990 | Onan et al. | 340/477 |
| 5,001,398 | 3/1991 | Dunn | 340/468 |
| 5,057,814 | 10/1991 | Onan et al. | 340/458 |
| 5,157,376 | 10/1992 | Dietz et al. | 340/458 |
| 5,216,328 | 6/1993 | Lu | 307/10.8 |

*Primary Examiner*—Jeffery A. Hofsass
*Assistant Examiner*—Nina Tong
*Attorney, Agent, or Firm*—John J. Posta, Jr.

[57] ABSTRACT

A system for use in monitoring the operation of motorcycle brake and tail lights is disclosed which, upon determination that a brake or tail light is not operating properly to provide a warning light signal, automatically provides an alternate warning light signal which is highly visible to traffic following the motorcycle. Current sensors are used to determine whether electricity is flowing through the brake light and tail light circuits, or, alternately, whether there is an open circuit condition in one or both circuits which is indicative of a burned-out bulb. If the tail light burns out, control switching elements are used to supply current to the left rear turn signal light, the right rear turn signal light, and the brake light to illuminate them, thereby providing a warning signal at the rear of the motorcycle. In addition, if the brake light burns out, control switching elements are used to supply current to the left rear turn signal light and the right rear turn signal light, thereby providing a warning signal at the rear of the motorcycle.

20 Claims, 5 Drawing Sheets

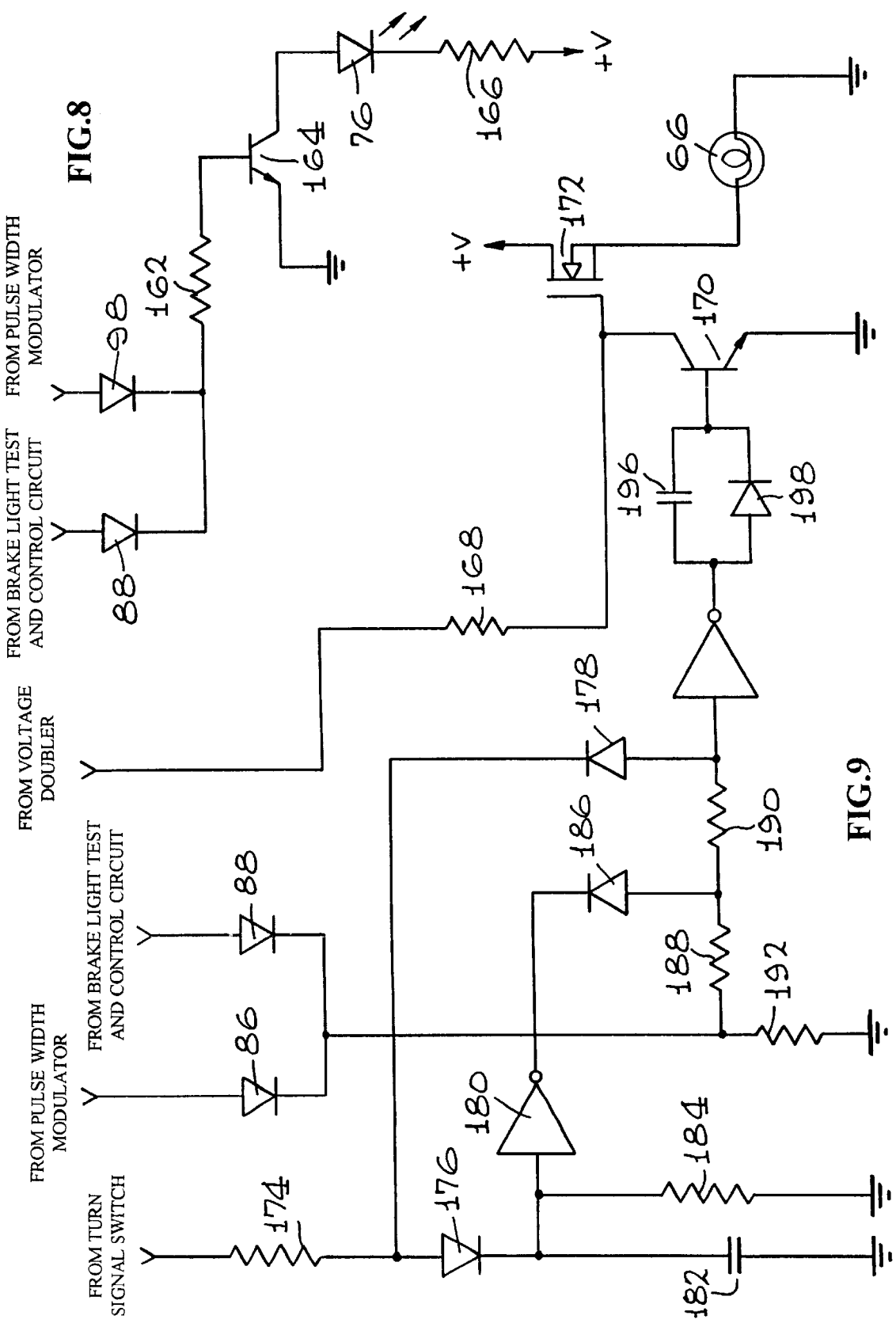

FAIL SAFE SYSTEM FOR PROVIDING WARNING SIGNALS UPON THE FAILURE OF MOTORCYCLE BRAKE OR TAIL LIGHTS

IDENTIFICATION OF RELATED APPLICATION

This application is a continuation-in-part of U.S. patent application Ser. No. 08/499,848, filed on Jul. 10, 1995, now is abandoned and entitled "Fail Safe System for Providing Warning Signals Upon the Failure of Motorcycle Brake or Tail Lights." The specification of U.S. patent application Ser. No. 08/499,848 in its entirety is hereby incorporated herein by reference.

BACKGROUND OF THE INVENTION

Field of the Invention

The present invention relates generally to motorcycle running, warning, and signal lights, and more particularly to a system for monitoring the operation of motorcycle brake and tail lights and, upon determination that a brake or tail light is not operating properly to provide a warning light signal, for automatically providing an alternate warning light signal which is highly visible to traffic following the motorcycle.

Motorcycles offer a relatively inexpensive alternative mode of transportation to automobiles, with many individuals preferring to ride motorcycles both when commuting and when riding for pleasure. While motorcycles are for the most part a safe mode of transportation, they are particularly at risk when drivers of automobiles fail to see them. With their smaller size, motorcycles are inherently less visible than automobiles, and thus use lights advantageously to enhance their visibility.

For this reason, proper operation of motorcycle lights are even more important than might otherwise be presumed. Since a high percentage of motorcycle accidents happen when a motorcycle is hit from behind, rear warning lights are particularly important for maintaining motorcycle safety. Brake lights and tail lights are particularly important, since, if they are not operating properly, a motorcycle may be significantly less visible to an automobile following the motorcycle. Properly operating brake and tail lights are even more important when the motorcycle is being operated during nighttime or twilight hours.

As might be expected, the art has acknowledged the problem of burned-out bulbs for some time, and in a wide variety of ways which may be categorized into two general categories. The first of these categories deals with merely providing an indication that a bulb is not operating properly, while the second category endeavors to somehow compensate for the burned-out bulb. Most of the pertinent references are general in nature, and are not particularly intended for use with a motorcycle.

In the first category, a number of the references deal with a burned-out turn signal bulb by flashing at a slower rate. Examples of this function include U.S. Pat. No. 4,910,496, to Hatanaka et al. and U.S. Pat. No. 5,157,376, to Dietz et al. A second group of reference in the first category provide a signal which may be used to light a warning indicator light when any bulb, including brake and tail lights in addition to turn signal lights, is burned out. Examples of such references include U.S. Pat. No. 4,222,047, to Finnegan, and U.S. Pat. No. 5,001,398, to Dunn. A third group of references in the first category both slow the turn signal flashing rate and provide an indicator light when a turn signal bulb is burned out. Examples of this type of system are U.S. Pat. No. 4,972,174 and U.S. Pat. No. 5,057,814, both to Onan et al.

The second category of references not only is able to sense when a bulb is burned out, but endeavors to compensate for the function of the burned-out bulb by lighting a redundant bulb. This approach seems to be the strong preference of the art, as indicated by the large number of references using it over an extended period of time. Examples of the second category include U.S. Pat. No. 2,342,639, to Bradley, U.S. Pat. No. 2,528,245, to Riggins, U.S. Pat. No. 3,076,123, to McDermott, U.S. Pat. No. 3,825,769, to Alford, Jr., U.S. Pat. No. 3,883,777, to Morita, U.S. Pat. No. 4,213,075, to Ericson, U.S. Pat. No. 4,380,718, to Miller, and U.S. Pat. No. 5,216,328, to Lu.

The first category described above is not acceptable since the lack of a brake light or tail light on a motorcycle, even for the short time after the operator notices the warning light and replaces the bulb, presents a high degree of risk of being hit from behind. With regard to the second category, all of the references in that category assume the existence of a back-up bulb element, which of course requires multiple or redundant bulbs. While many automobiles have a sufficient number of bulbs to ensure the ready availability of redundant bulbs, such is not the case with most motorcycles.

It is accordingly the primary objective of the present invention that it provide a warning light signal visible from the rear of a motorcycle when either the brake light or the tail light of the motorcycle are burned out. It is a closely related objective of the present invention that the warning light be highly visible, and that it be provided from the rear of the motorcycle so as to provide following vehicles with an enhanced indication of the location of the rear of the motorcycle. It is an additional objective of the motorcycle rear warning light system of the present invention that its operation be both swift and fully automatic, occurring without requiring intervention of the motorcycle rider immediately upon the occasion of a burned-out brake light bulb or tail light bulb.

It is a further objective of the motorcycle rear warning light system of the present invention that it be easy to install in any motorcycle's electrical system, requiring essentially only that it be plugged into the existing system, and that it require no additional modifications. In an additional optional implementation, it is an objective that the motorcycle rear warning light system of the present invention provide a warning indication to the operator of the motorcycle that a brake light bulb or a tail light bulb has burned out, and that the system has operated to compensate for the burned-out bulb. It is also an objective of the system of the present invention that it even be adaptable for use on other motor vehicles, such as automobiles.

The motorcycle rear warning light system of the present invention must also be of construction which is both durable and long lasting, and it should also require little or no maintenance to be provided by the user throughout its operating lifetime. In order to enhance the market appeal of the motorcycle rear warning light system of the present invention, it should also be of inexpensive construction to thereby afford it the broadest possible market. Finally, it is also an objective that all of the aforesaid advantages and objectives of the motorcycle rear warning light system of the present invention be achieved without incurring any substantial relative disadvantage.

SUMMARY OF THE INVENTION

The disadvantages and limitations of the background art discussed above are overcome by the present invention.

With this invention, a motorcycle rear warning light system is provided to immediately detect when either the brake light or tail light of a motorcycle has burned out (or exhibit an open circuit condition for any other reason). Upon detection of a burned out brake light, the motorcycle rear warning light system of the present invention operates to automatically illuminate the rear turn signal lights on both the left and the right sides of the motorcycle. Upon detection of a burned out tail light, the motorcycle rear warning light system of the present invention operates to automatically illuminate the brake light and the rear turn signal lights on both the left and the right sides of the motorcycle (at reduced intensity).

The motorcycle rear warning light system of the present invention operates to monitor the brake light of a motorcycle by using a current sensor to determine whether electricity is flowing through the brake light circuit, or whether there is an open circuit condition indicative of a burned-out brake light bulb. If the current sensor does not detect the flow of current when the brake light is supposed to be actuated (and electrical current is being supplied to the circuit), an open circuit is detected (most likely indicating that the brake light is burned out). Upon detection of an open brake light circuit, the motorcycle rear warning light system of the present invention supplies current to both the left rear turn signal light and the right rear turn signal light, illuminating them for as long as current is supplied to the brake light circuit (except when one of the turn signals is flashing to indicate a turn).

Thus, if the brake light is burned out, whenever the brakes of the motorcycle are actuated, the left and right rear turn signal lights will be illuminated, thereby providing a highly visible signal to following vehicles. The present invention utilizes buffering elements to ensure that electrical signals from the turn signal circuitry are not fed to the brake light, and vice versa.

The motorcycle rear warning light system of the present invention also operates to detect an open circuit condition in the tail light circuit by using a second current sensor to determine whether electricity is flowing through the tail light circuit, or whether there is an open circuit condition indicative of a burned-out tail light bulb. If the second current sensor does not detect the flow of current when the tail light is supposed to be actuated (and electrical current is being supplied to the circuit), an open circuit is detected (most likely indicating that the tail light is burned out).

Upon detection of an open tail light circuit, the motorcycle rear warning light system of the present invention supplies current to the brake light and to both the left rear turn signal light and the right rear turn signal light, illuminating them for as long as current is supplied to the tail light circuit(except when one of the turn signals is flashing to indicate a turn). In the preferred embodiment, pulse width modulation (or a resistor) may be used to cause the brake light and the left and right turn signal lights to be illuminated at less than full brightness.

Thus, if the tail light is burned out, whenever the running lights of the motorcycle are actuated, the brake light and the left and right rear turn signal lights will be illuminated (at less than full brightness), thereby providing a highly visible signal to following vehicles. The present invention again utilizes buffering elements to ensure that electrical signals from the running light circuitry, the brake light circuitry, and the turn signal circuitry remain independent.

In another aspect of the present invention, a warning light such as an LED may be mounted near the instrument panel of the motorcycle to provide the rider with an indication that an open circuit condition exists in either the brake light circuit or the tail light circuit. A brightly lit LED indicates an open circuit in the brake light circuit, while a more dimly lit LED indicates an open circuit in the tail light circuit. Other variations and enhancements to the motorcycle rear warning light system of the present invention will be readily apparent to those skilled in the art.

It may therefore be seen that the present invention teaches a system for providing a warning light signal visible from the rear of a motorcycle when either the brake light or the tail light of the motorcycle are burned out. The warning light provided by the motorcycle rear warning light system of the present invention is highly visible, and is provided from the rear of the motorcycle so as to thereby provide following vehicles with an enhanced indication of the location of the rear of the motorcycle. Operation of the motorcycle rear warning light system of the present invention is both swift and fully automatic, and occurs immediately upon the occasion of a burned-out brake light or tail light bulb without requiring intervention of the motorcycle rider.

The motorcycle rear warning light system of the present invention is easy to install in any motorcycle's electrical system, and requires only that it be plugged into the existing system, thereby requiring no modifications to the electrical system. In the preferred embodiment, the motorcycle rear warning light system of the present invention provides a warning indication to the operator of the motorcycle to indicate that a brake light or a tail light has burned out, and that the system has operated to compensate for the burned-out bulb. The system of the present invention is even adaptable for use on other motor vehicles, such as automobiles.

The motorcycle rear warning light system of the present invention is of construction which is both durable and long lasting, and it requires little or no maintenance to be provided by the user throughout its operating lifetime. The motorcycle rear warning light system of the present invention is also of inexpensive construction, thereby enhancing its market appeal and affording it the broadest possible market. Finally, all of the aforesaid advantages and objectives of the present invention are achieved without incurring any substantial relative disadvantage.

DESCRIPTION OF THE DRAWINGS

These and other advantages of the present invention are best understood with reference to the drawings, in which:

FIG. 8 is an exemplary electrical schematic diagram of the fault indicator circuit and the warning LED shown in the functional schematic block diagram illustrated in FIG. 6; and FIG. 9 is an exemplary electrical schematic diagram of the right turn signal driver circuit shown in the functional schematic block diagram illustrated in FIG. 6 (the left turn signal driver circuit shown in the functional schematic block diagram illustrated in FIG. 6 being of identical construction to the illustrated right turn signal driver circuit).

DETAILED DESCRIPTION OF THE PREFERRED EMBODIMENTS

The preferred embodiment of the present invention is particularly adapted for use with the warning light system of a motorcycle, although its applications extend to other motor vehicles as well. It will be understood that the following description of the motorcycle rear warning light system of the present invention is accordingly by way of example, and not by way of limitation. In addition, prior to describing the construction and operation of the present invention, a brief description of a typical motorcycle's warning light system will be provided below.

Figure 1:
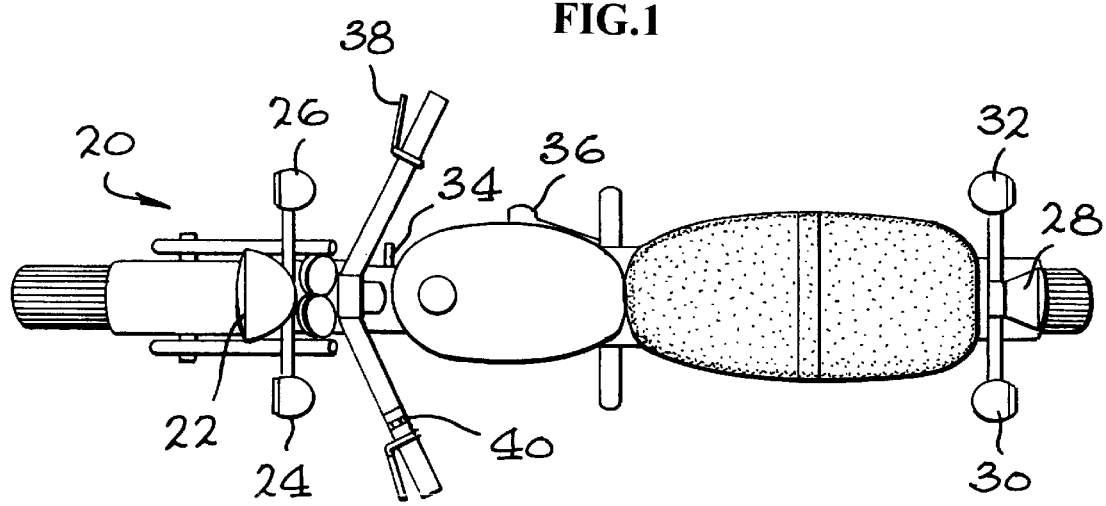
FIG. 1 is a somewhat schematic top plan view of a motorcycle showing the various lights thereon, including the brake/tail light and the left and right turn signal lights.

Referring first to FIG. 1, a motorcycle 20 is illustrated in a top view which shows many of the lights which are commonly prevent on all motorcycles. Located at the front of the motorcycle 20 is a headlight 22, a left front turn signal 24, and a right front turn signal 26. Located at the rear of the motorcycle 20 is a brake/tail light 28, a left rear turn signal 30, and a right rear turn signal 32. It will be understood by those skilled in the art that the brake/tail light 28 includes both a brake light and a tail light in a single enclosure.

The motorcycle 20 depicted in FIG. 1 also is useful in illustrating some of the various switches and control elements used to control the operation of the various warning lights described above. A key switch 34 is commonly used both to turn the motorcycle 20 on, as well as to operate the running lights of the motorcycle 20. Thus, the key switch 34 is used to operate the headlight 22 and the tail light of the brake/tail light 28. All recent motorcycles use the key switch 34 to automatically turn on these running lights whenever the motorcycle is operative.

A brake pedal 36 located on the right side of the motorcycle 20 and a brake lever 38 located on the right handlebar of the motorcycle 20 are used to actuate the brakes, and will also actuate one or two brake light switches (not shown in FIG. 1). A turn signal switch 40 located on the left handlebar of the motorcycle 20 is used to selectively actuate either the left front turn signal 24 and the left rear turn signal 30, or the right front turn signal 26 and the right rear turn signal 32.

Figure 2:
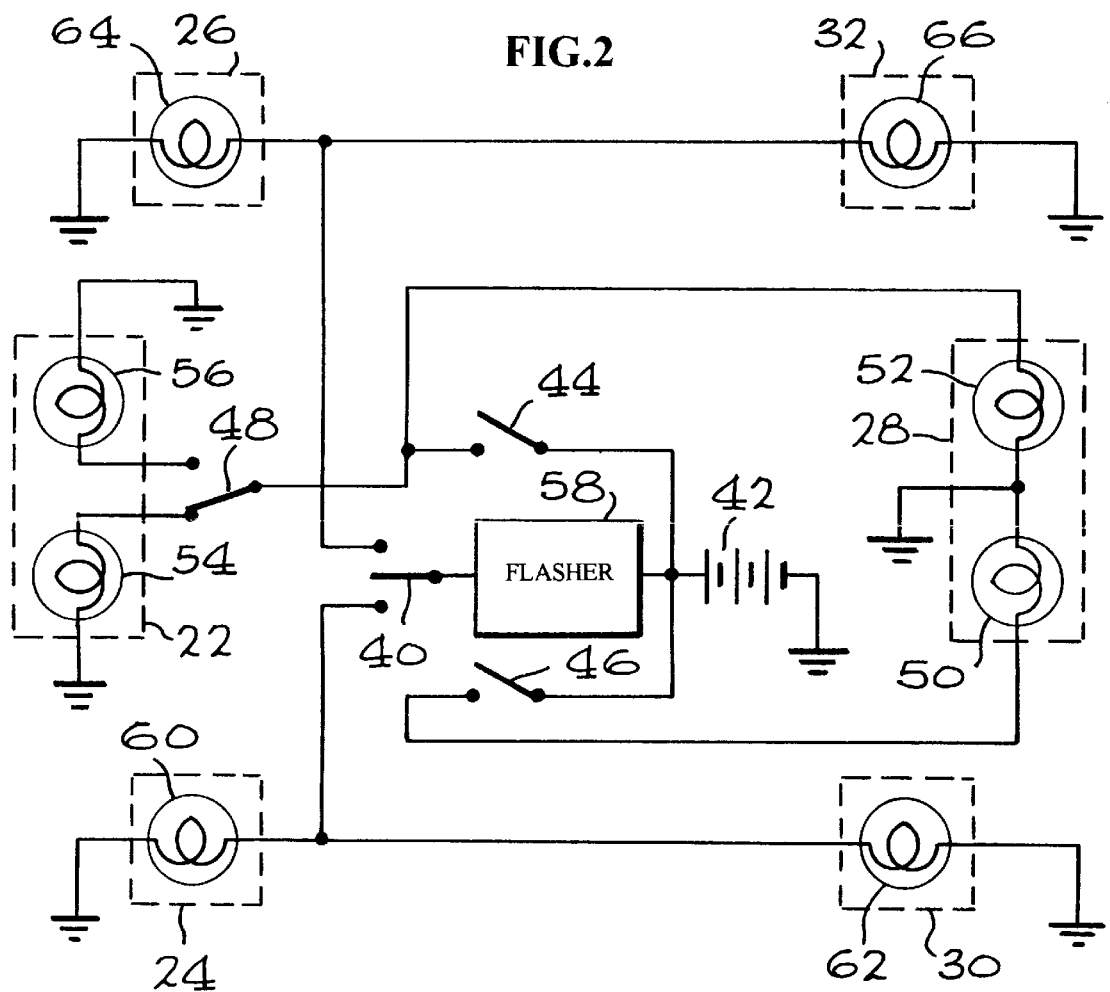
FIG. 2 is a simplified electrical schematic of the light control system for the motorcycle illustrated in FIG. 1.

Referring next to FIG. 2, a simplified electrical schematic of the warning lights of the motorcycle 20 illustrated in FIG. 1 is shown. A power supply 42 which is typically a DC battery is shown as powering the warning light system illustrated in FIG. 2. The negative side of the power supply 42 is grounded.

Four switches are illustrated in the schematic shown in FIG. 2: a running light switch 44 (which is part of the key switch 34 illustrated in FIG. 1), a brake light switch 46, the turn signal switch 40, and a headlight dimming switch 48. (Note that only the single brake light switch 46 is shown in FIG. 2 although there typically are two different switches actuated respectively by the brake pedal 36 and the brake lever 38, both illustrated in FIG. 1, which are connected in parallel.) The running light switch 44 and the brake light switch 46 are single pole, single throw switches, the turn signal switch 40 is a single pole, double throw switch with a neutral center position, and the headlight dimming switch 48 is a single pole, double throw switch.

One side of the brake light switch 46 is connected to the positive side of the power supply 42, with the other side of the brake light switch 46 being connected to one side of a brake light bulb 50 in the brake/tail light 28. The other side of the brake light bulb 50 is grounded. One side of the running light switch 44 is connected to the positive side of the power supply 42, with the other side of the running light switch 44 being connected to the throw of the headlight dimming switch 48, and to one side of a tail light bulb 52 in the brake/tail light 28. The other side of the tail light bulb 52 is grounded.

One contact of the headlight dimming switch 48 is connected to one side of a headlight low beam filament 54, the other side of which is grounded. The other contact of the headlight dimming switch 48 is connected to one side of a headlight high beam filament 56, the other side of which is grounded. The headlight low beam filament 54 and the headlight high beam filament 56 are both located in the headlight 22.

A flasher element 58 is connected on one side thereof to the positive side of the power supply 42, and on the other side thereof to the throw of the turn signal switch 40. One contact of the turn signal switch 40 is connected to one side of a left front turn signal bulb 60 in the left front turn signal 24 and to one side of a left rear turn signal bulb 62 in the left rear turn signal 30. The other sides of the left front turn signal bulb 60 and the left rear turn signal bulb 62 are grounded. The other contact of the turn signal switch 40 is connected to one side of a right front turn signal bulb 64 in the right front turn signal 26 and to one side of a right rear turn signal bulb 66 in the right rear turn signal 32. The other sides of the right front turn signal bulb 64 and the right rear turn signal bulb 66 are grounded.

Figure 3:
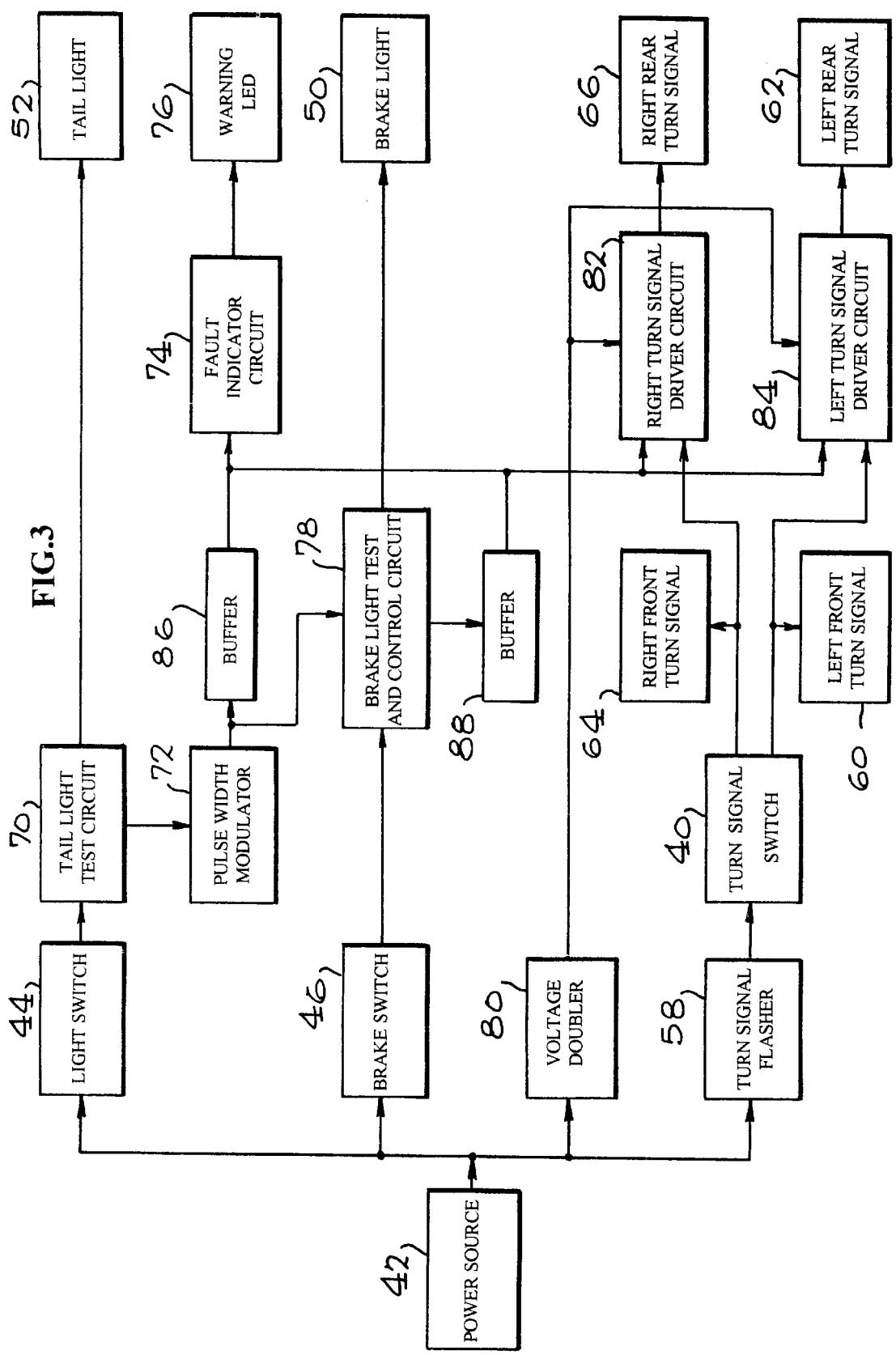
FIG. 3 is a functional schematic block diagram of a motorcycle rear warning light system constructed according to the teachings of the present invention for monitoring both the brake light circuit and the tail light circuit, actuating the brake light and the left and right rear turn signal lights upon an open circuit in the tail light, and actuating the left and right rear turn signal lights upon an open circuit in the brake light.

Referring next to FIG. 3, a functional schematic block diagram of the motorcycle rear warning light system of the present invention is illustrated. Note that the turn signal switch 40, the power supply 42, the running light switch 44, the brake light switch 46, the brake light bulb 50, the tail light bulb 52, the flasher element 58, the left front turn signal bulb 60, the left rear turn signal bulb 62, the right front turn signal bulb 64, and the right rear turn signal bulb 66 of FIG. 2 are present in FIG. 3 (and are shown in block diagram rather then schematic form). The other elements of the present invention also illustrated in FIG. 3 are a tail light test circuit 70, a pulse width modulator 72, a fault indicator circuit 74 which drives a warning LED 76, a brake light test and control circuit 78, a voltage doubler 80, a right turn signal driver circuit 82, a left turn signal driver circuit 84, and two buffers 86 and 88.

The operation of the motorcycle rear warning light system of the present invention in monitoring the brake light will be described first, after which the operation of the motorcycle rear warning light system in monitoring the tail light will then be described. The brake light test and control circuit 78 is placed in series intermediate the brake light switch 46 and the brake light bulb 50, such that when the brake light switch 46 is activated, if current flows through the circuit to the brake light bulb 50, it will be sensed by the brake light test and control circuit 78, and the brake light bulb 50 will be lit. Conversely, if when the brake light switch 46 is activated current is not sensed by the brake light test and control circuit 78, the brake light test and control circuit 78 will have detected an open circuit situation most likely indicative of the brake light bulb 50 being burned out.

Upon detection of an open circuit by the brake light test and control circuit 78, a signal will be provided by the brake light test and control circuit 78 through the buffer 88 to the right turn signal driver circuit 82 and the left turn signal driver circuit 84. The right turn signal driver circuit 82 is installed intermediate the turn signal switch 40 and the right rear turn signal bulb 66, while the left turn signal driver circuit 84 is installed intermediate the turn signal switch 40 and the left rear turn signal bulb 62. The signal provided from the brake light test and control circuit 78 due to an open brake light circuit will cause the right turn signal driver circuit 82 and the left turn signal driver circuit 84 to supply power to the left rear turn signal bulb 62 and the right rear turn signal bulb 66, respectively.

The function of the buffer 88 is to electrically isolate the brake light test and control circuit 78 from the right turn signal driver circuit 82 and the left turn signal driver circuit 84, so that an electrical output from the turn signal switch 40 will have no effect on the brake light test and control circuit 78. The left rear turn signal bulb 62 and the right rear turn signal bulb 66 will still be operable by the turn signal switch 40, which will cause them to flash, overriding the signal from the brake light test and control circuit 78.

As long as the brake light bulb 50 is not burned out (and the brake light circuit is not, for some other reason, an open circuit), both the brake light circuit and the turn signal circuit will operate as is normal. If the brake light bulb 50 is burned out and causes an open circuit in the brake light circuit, the brake light test and control circuit 78 will detect this occurrence and cause the right turn signal driver circuit 82 and the left turn signal driver circuit 84 to drive the right rear turn signal bulb 66 and the left rear turn signal bulb 62, respectively, to be illuminated whenever the brake light switch 46 is activated. The motorcycle rear warning light system of the present invention will thereby provide a warning signal from the rear of the motorcycle 20 (FIG. 1 ) even when the brake light bulb 50 is burned out.

The motorcycle rear warning light system of the present invention has a second system for monitoring the tail light bulb 52. The tail light test circuit 70 is placed in series intermediate the running light switch 44 and the tail light bulb 52, such that when the running light switch 44 is activated, if current flows through the tail light bulb 52, it will be sensed by the current sensor 100, and the tail light bulb 52 will be lit. Conversely, if when the running light switch 44 is activated current is not sensed by the tail light test circuit 70, the tail light test circuit 70 will have detected an open circuit situation most likely indicative of the tail light bulb 52 being burned out.

Upon detection of an open circuit by the tail light test circuit 70, a signal will be provided by the tail light test circuit 70 to the pulse width modulator 72. The pulse width modulator 72 functions to modulate the signal from the tail light test circuit 70 to change what was a constant signal into a rapidly modulated series of pulses. When this signal is used to operate a light, it will cause it to glow less brightly that would the constant signal from the tail light test circuit 70. The pulses are sufficiently rapid so that the light appears to be constant rather than flickering. Thus, the pulse width modulator 72 acts much like a series resistor, without presenting the same heat dissipation problems which a resistor would present. If desired, a resistor could be substituted for the pulse width modulator 72 without departing from the spirit of the present invention.

The pulse width modulated signal provided from the tail light test circuit 70 through the pulse width modulator 72 is then supplied both to the brake light test and control circuit 78, and through the buffer 86 to the right turn signal driver circuit 82 and the left turn signal driver circuit 84. The signal provided from the tail light test circuit 70 due to an open tail light circuit will cause the right turn signal driver circuit 82 and the left turn signal driver circuit 84 to supply power to the left rear turn signal bulb 62 and the right rear turn signal bulb 66, respectively. Both will glow with less than their full intensity.

The function of the buffer 86 is to electrically isolate the tail light test circuit 70 and the pulse width modulator 72 from the right turn signal driver circuit 82 and the left turn signal driver circuit 84, so that an electrical output from the turn signal switch 40 will have no effect on the tail light test circuit 70. The left rear turn signal bulb 62 and the right rear turn signal bulb 66 will still be operable by the turn signal switch 40, which will cause them to flash, overriding the signal from the brake light test and control circuit 78.

The signal provided from the tail light test circuit 70 due to an open tail light circuit will also cause the brake light test and control circuit 78 to supply power to the brake light bulb 50, which will glow with less than its full intensity. The brake light bulb 50 will still be operable by the brake light switch 46, which will cause it to glow at full intensity, overriding the signal from the tail light test circuit 70.

As long as the tail light bulb 52 is not burned out (and the tail light circuit is not, for some other reason, an open circuit), the tail light circuit, the turn signal circuit, and the brake light circuit will operate as is normal. If the tail light bulb 52 is burned out and causes an open circuit in the tail light circuit, the tail light test circuit 70 will detect this occurrence and cause the right turn signal driver circuit 82, the left turn signal driver circuit 84, and the brake light test and control circuit 78 to drive the right rear turn signal bulb the right rear turn signal bulb 66, the left rear turn signal bulb 62, and the brake light bulb 50 to be illuminated whenever the running light switch 44 is activated. The motorcycle rear warning light system of the present invention will thereby provide a warning signal from the rear of the motorcycle 20 (FIG. 1 even when the tail light bulb 52 is burned out.

The voltage doubler 80 is used to provide a higher operating voltage from the power supply 42, which is connected to supply power to the voltage doubler 80, to drive components used in the construction of the brake light test and control circuit 78, the right turn signal driver circuit 82, and the left turn signal driver circuit 84. This will become apparent in conjunction with the description of these devices respectively provided in conjunction with the discussions of FIGS. 4 and 6 below.

In an optional aspect of the motorcycle rear warning light system of the present invention as illustrated in FIG. 3, the warning LED 76 is used to provide an indication to the motorcycle rider that the motorcycle rear warning light system of the present invention has detected an open circuit in the brake light circuit or in the tail light circuit. The warning LED 76 may be mounted at the front of the motorcycle 20 (FIG. 1 ) for better visibility to the rider.

The warning LED 76 is driven by the fault indicator circuit 74, which is connected to the output of the buffers 86 and 88. The fault indicator circuit 74 will illuminate the warning LED 76 at full intensity upon getting a signal indicating that the brake light test and control circuit 78 has detected that the brake light bulb 50 is burned out (or there is an open circuit in the brake light circuit for some other reason). Similarly, fault indicator circuit 74 will illuminate the warning LED 76 at a less than full intensity upon getting a signal indicating that the tail light test circuit 70 has detected that the tail light bulb 52 is burned out (or there is an open circuit in the tail light circuit for some other reason).

Figure 4:
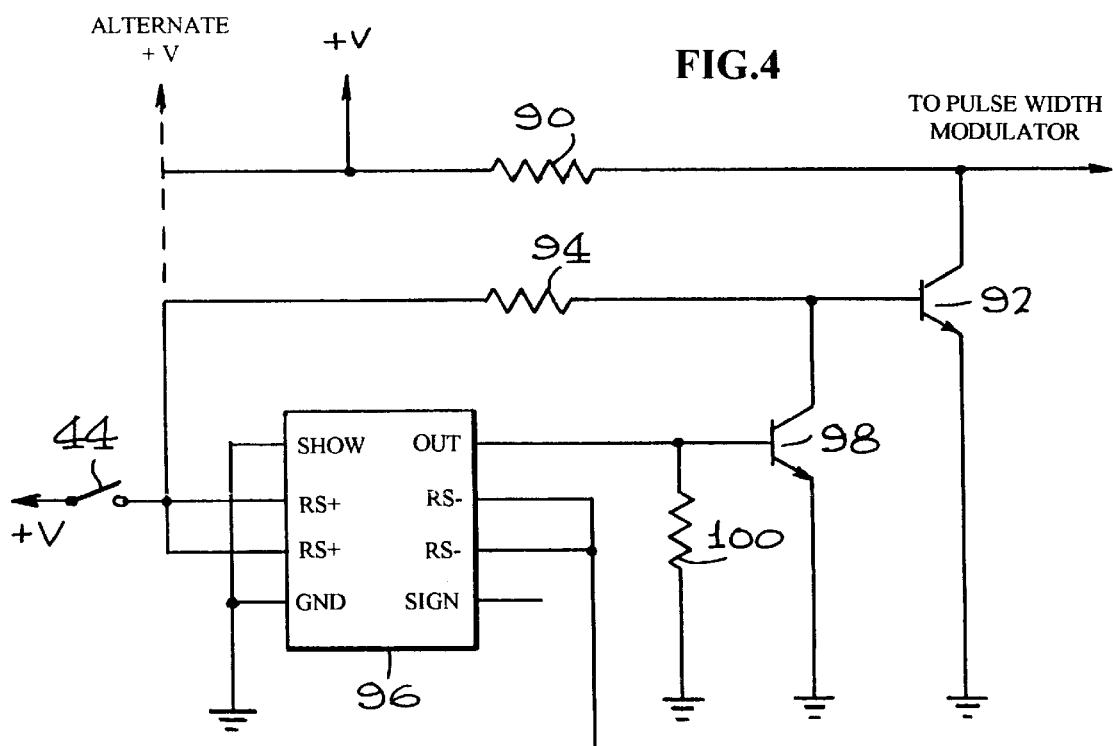
FIG. 4 is an exemplary electrical schematic diagram of the tail light test circuit shown in the functional schematic block diagram illustrated in FIG. 6.

Referring now to FIG. 4, an exemplary schematic of the tail light test circuit 70 shown in FIG. 3 is illustrated, together with the running light switch 44 and the tail light bulb 52. A first side of a resistor 90 is connected to the positive side of the power supply 42 (which shall be referred to herein as +V). A second side of the resistor 90 is connected to the collector of a transistor 92, and will also be the output of the tail light test circuit 70 (which will be supplied to the pulse width modulator 72 shown in FIG. 3). The emitter of the transistor 92 is connected to ground.

The first side of the resistor 90 is also shown to be connected to a first side of a resistor 94 by a dotted line. This dotted line is a wire which is cut unless the motorcycle 20 (shown in FIG. 1) is of the newer type having its lights (including the tail light bulb 52) illuminated whenever it is on. If the motorcycle 20 is of the newer type, instead of the connection of the first side of the resistor 90 to +V, the first side of the resistor 90 would instead be connected to an alternate source of +V, typically the tail light wire from the newer type of motorcycle. If, however, the motorcycle 20 is of the older type not having the lights illuminated whenever the motorcycle 20 is turned on, then the wire represented by the dotted line is cut.

The first side of the resistor 94 is also connected to the side of the running light switch 44 not connected to +V, and to the two RS+ pins of an integrated circuit 96. The second side of the resistor 94 is connected to the base of the transistor 92 and the collector of a transistor 98. The emitter of the transistor 98 is connected to ground. The base of the transistor 98 is connected to the OUT pin of the integrated circuit 96, and to one side of a resistor 100. The other side of the resistor 100 and the SHOW and GND pins of the integrated circuit 96 are also connected to ground. The two RS– pins of the integrated circuit 96 are connected to one side of the tail light bulb 52, the other side of which is connected to ground.

The integrated circuit 96 is a current-sense amplifier, such as a Maxim MAX471 device from Maxim Integrated Products. The operation of the tail light test circuit 70 will now be briefly described. If the tail light bulb 52 is not burned out, current will flow through the integrated circuit 96 when the running light switch 44 is closed. If current is detected, the integrated circuit 96 will provide a voltage which will be provided to the base of the transistor 98, which is turned on by the voltage on its base. This causes the base of the transistor 92 to be grounded, keeping it turned off and ensuring that the high voltage on the collector of the transistor 92 will be provided as an output from the tail light test circuit 70 to the pulse width modulator 72 (shown in FIG. 1).

Conversely, if the tail light bulb 52 is burned out, the integrated circuit 96 will not detect the flow of current, and will thus not provide a voltage to the base of the transistor 98. The transistor 98 will thus be turned off, ensuring that the base of the transistor 92 is high, turning the transistor 92 on. This will result in the collector of the transistor 92 being grounded, and the low voltage grounded on the collector of the transistor 92 will be provided as an output from the tail light test circuit 70 to the pulse width modulator 72.

Figure 5:
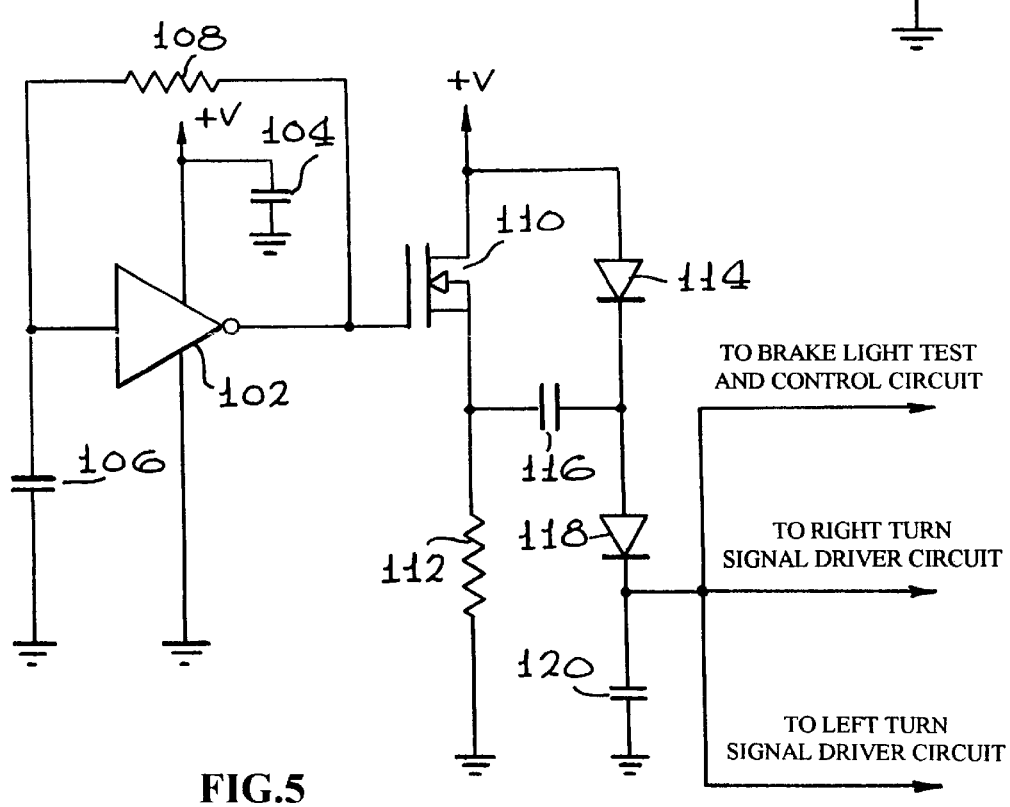
FIG. 5 is an exemplary electrical schematic diagram of the voltage doubler shown in the functional schematic block diagram illustrated in FIG. 6.

Referring next to FIG. 5, an exemplary schematic of the voltage doubler 80 is illustrated. A Schmitt hex inverter 102 is used in the voltage doubler 80, and other Schmitt hex inverters will be used in other components of the motorcycle rear warning light system of the present invention, as will become apparent below. The Schmitt hex inverter 102, and the other Schmitt hex inverters, will all be powered by a single connection to +V and a single connection to ground, which connections are illustrated in FIG. 5. These connections to +V and to ground will not be illustrated in conjunction with the other Schmitt hex inverters, but it will be understood that they exist. Note that a capacitor 104 is also connected across +V and ground.

A first side of a capacitor 106 is connected to the input of the Schmitt hex inverter 102, and a second side of the capacitor 106 is grounded. A first side of a resistor 108 is also connected to the input of the Schmitt hex inverter 102, and a second side of the resistor 108 is connected to the output of the Schmitt hex inverter 102, which is also connected to the gate of a MOSFET 110. The source of the MOSFET 110 is connected to a first side of a resistor 112, with a second side of the resistor 112 being grounded.

The drain of the MOSFET 110 is connected to +V, and also to the anode of a diode 114. A first side of a capacitor 116 is connected to the source of the MOSFET 110, and a second side of the capacitor 116 is connected to the cathode of the diode 114. The cathode of the diode 114 is also connected to the anode of a diode 118, and the cathode of the diode 118 is connected to a first side of a capacitor 120, with this common point also being the output of the voltage doubler 80. A second side of the capacitor 120 is grounded.

The Schmitt hex inverter 102 is one-sixth of a hex Schmitt trigger IC, such as an MC14584B device from Motorola. The operation of the voltage doubler 80 will now be briefly described. If the input to the Schmitt hex inverter 102 is low, the capacitor 106 will be discharged and the output of the Schmitt hex inverter 102 will be high. The high output from the Schmitt hex inverter 102 will charge the capacitor 106 through the resistor 108. At some point, the capacitor 106 will have sufficient voltage to take the input to the Schmitt hex inverter 102 high, causing the Schmitt hex inverter 102 to go low. This will cause the capacitor 106 to discharge through the resistor 108, and it is thus apparent that the output of the Schmitt hex inverter 102 will oscillate between high and low voltage.

The oscillating output from the Schmitt hex inverter 102 will alternately turn the MOSFET 110 on and off. When the MOSFET 110 is on, it connects the capacitor 116 to +V, and passes that voltage to the connection between the cathode of the diode 114 and the anode of the diode 118. When the MOSFET 110 is off, the connection of the anode of the diode 114 to +V is added to the voltage on the anode of the diode 118, charging the output of the voltage doubler 80 to double the input voltage +V. This output voltage is supplied to the fault indicator circuit 74, the right turn signal driver circuit 82, and the left turn signal driver circuit 84.

Figure 6:
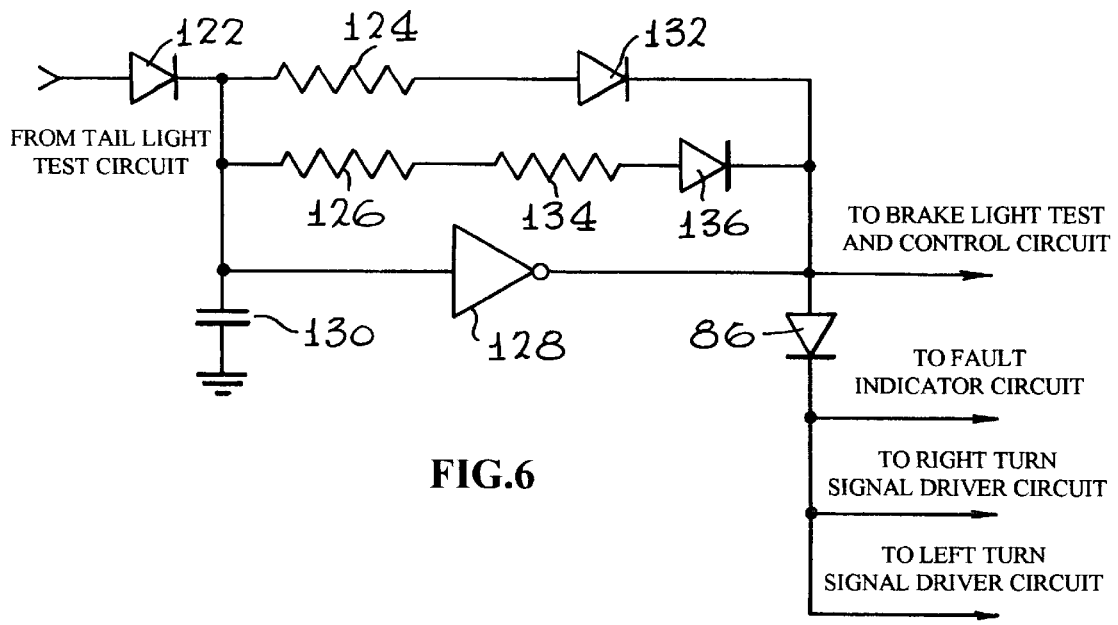
FIG. 6 is an exemplary electrical schematic diagram of the pulse width modulator shown in the functional schematic block diagram illustrated in FIG. 6.

Referring now to FIG. 6, an exemplary schematic of the pulse width modulator 72 is illustrated, together with the buffer 86. The signal from the tail light test circuit 70 is supplied to the anode of a diode 122. The cathode of the diode 122 is connected to a first side of a resistor 124, a first side of a resistor 126, the input of a Schmitt hex inverter 128, and a first side of a capacitor 130. A second side of the capacitor 130 is grounded.

A second side of the resistor 124 is connected to the cathode of a diode 132, the anode of which is connected to the output of the Schmitt hex inverter 128, which also serves as the output of the pulse width modulator 72 to the brake light test and control circuit 78 and to the buffer 86 (which provides the buffered output of the pulse width modulator 72 to the fault indicator circuit 74, the right turn signal driver circuit 82, and the left turn signal driver circuit 84). A second side of the resistor 126 is connected to a first side of a resistor 134. A second side of the resistor 134 is connected to the anode of a diode 136, the cathode of which is connected to the output of the Schmitt hex inverter 128.

The operation of the pulse width modulator 72 will now be briefly described. The Schmitt hex inverter 128 again functions as an oscillator much like the function of the Schmitt hex inverter 102 in FIG. 5, with one exception—the time that the output of the Schmitt hex inverter 128 is high is longer than the time that it is low. This is accomplished by discharging the capacitor 130 through the diode 136 faster than it is charged through the diode 132. Thus, the resistance of the resistor 124 is greater than the sum of the resistances of the resistor 126 and the resistor 134. Both the resistor 126 and the resistor 134 are used in order to fine tune the total discharge resistance.

It will be appreciated by those skilled in the art that the tail light test circuit 70 will cause the pulse width modulator 72 to operate only when the tail light bulb 52 (shown in FIG. 1) has burned out. The output of the pulse width modulator 72 is provided through the buffer 86 to the fault indicator circuit 74, the right turn signal driver circuit 82, and the left turn signal driver circuit 84. When the running light switch 44 (shown in FIG. 1) is operated with the tail light bulb 52 (also shown in FIG. 1) burned out, the pulse width modulator 72 will drive the right turn signal driver circuit 82 (shown in FIG. 1) and the left turn signal driver circuit 84 (also shown in FIG. 1) to illuminate the right rear turn signal bulb 66 (also shown in FIG. 1) and the left rear turn signal bulb 62 (also shown in FIG. 1).

Since the output of the pulse width modulator 72 is pulse width modulated, a light bulb lit by the output of the pulse width modulator 72 will necessarily appear to be dimmer than a light bulb lit directly by +V. In addition, the speed of the oscillation will be sufficiently fast so that there will be no apparent flicker. The function of the pulse width modulator 72 is thus similar to that of a resistor, which could also be used to dim the intensity of a bulb. The pulse width modulator 72 has the advantage that, unlike a resistor, it does not generate a substantial amount of heat if it is used for essentially continuous use.

Figure 7:
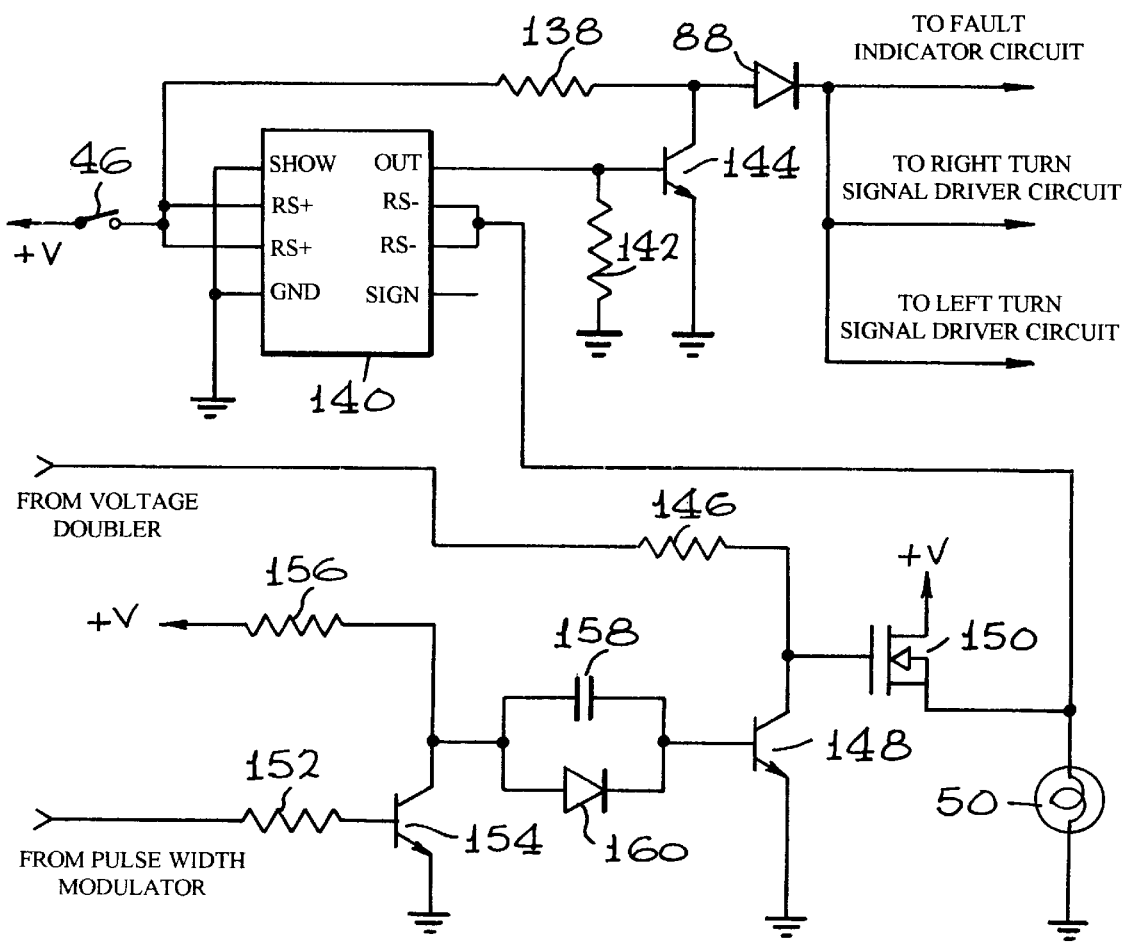
FIG. 7 is an exemplary electrical schematic diagram of the brake light test and control circuit shown in the functional schematic block diagram illustrated in FIG. 6.

Referring next to FIG. 7, an exemplary schematic of the brake light test and control circuit 78 is illustrated, together with the brake light switch 46, the brake light bulb 50, and the buffer 88. A first side of a resistor 138 is connected to the side of the brake light switch 46 not connected to +V, and to the two RS+ pins of an integrated circuit 140. The SHOW and GND pins of the integrated circuit 140 are also connected to ground. The OUT pin of the integrated circuit 140 is connected to a first side of a resistor 142, and to the base of a transistor 144. A second side of the resistor 142 is grounded.

A second side of the resistor 138 is connected to the collector of the transistor 144, and to the anode of the buffer 88, the cathode of which is connected to drive the fault indicator circuit 74, the right turn signal driver circuit 82, and the left turn signal driver circuit 84. The emitter of the transistor 144 is connected to ground. The two RS− pins of the integrated circuit 140 are connected to one side of the brake light bulb 50, the other side of which is connected to ground.

The integrated circuit 140 is another current-sense amplifier, such as a Maxim MAX471 device from Maxim Integrated Products. The operation of this portion of the brake light test and control circuit 78 will now be briefly described. If the brake light bulb 50 is not burned out, current will flow through the integrated circuit 140 when the brake light switch 46 is closed. If current is detected, the integrated circuit 140 will provide a voltage which will be provided to the base of the transistor 144, which is turned on by the voltage on its base. This causes the base of the transistor 144 to be grounded, providing no input to the fault indicator circuit 74, the right turn signal driver circuit 82, and the left turn signal driver circuit 84.

Conversely, if the brake light bulb 50 is burned out, the integrated circuit 140 will not detect the flow of current, and will thus not provide a voltage to the base of the transistor 144. The transistor 144 will thus be turned off, ensuring that a high output is provided to the fault indicator circuit 74, the right turn signal driver circuit 82, and the right turn signal driver circuit 82. This will drive the right turn signal driver circuit 82 and the left turn signal driver circuit 84 to illuminate the right rear turn signal bulb 66 (shown in FIG. 1) and the left rear turn signal bulb 62 (also shown in FIG. 1), respectively, whenever the brake light switch 46 is depressed when the brake light bulb 50 is burned out.

The remaining circuitry of FIG. 7 drives the brake light bulb 50 (shown in FIG. 1) to be illuminated when the tail light bulb 52 is burned out. The doubled voltage is supplied from the voltage doubler 80 to a first side of a resistor 146, a second side of which is connected to the collector of a transistor 148 and to the gate of a MOSFET 150. The drain of the MOSFET 150 is connected to +V, and the source of the MOSFET 150 is connected to the non-grounded side of the brake light bulb 50.

One side of a resistor 152 is connected to the (unbuffered) output of the pulse width modulator 72, and the other side of the resistor 152 is connected to the base of a transistor 154. The emitter of the transistor 154 is grounded. One side of a resistor 156 is connected to +V, and the other side of the resistor 156 is connected to the collector of the transistor 154, to a first side of a capacitor 158, and to the anode of a diode 160. The second side of the capacitor 158 and cathode of the diode 160 are connected to the base of the transistor 148. The emitter of the transistor 148 is grounded.

The operation of this part of the brake light test and control circuit 78 will now be briefly described. The MOSFET 150 acts as a switch to turn on the brake light bulb 50 whenever the input to the MOSFET 150 goes high. Since when the brake light bulb 50 is on it will have 12V across it, the voltage doubler 80 is necessary to raise the voltage on the gate of the MOSFET 150 enough above the voltage on its source to turn it on fully.

The transistor 154 is driven by the output of the pulse width modulator 72. When the output of the pulse width modulator 72 is high, the output of the transistor 154 will be low, and vice versa. The output of 154 drives the transistor 148. When the output of the transistor 154 is high, the output of the transistor 148 will be low, and vice versa. Finally, the transistor 148 drives the MOSFET 150. When the output of the transistor 148 is high, the MOSFET 150 is turned on to illuminate the brake light bulb 50, and when the output of the transistor 148 is low, the MOSFET 150 is turned off, turning off the brake light bulb 50.

Due to the pulse width modulated signal from the pulse width modulator 72, the MOSFET 150 will oscillate to illuminate the brake light bulb 50 on a less than one hundred percent duty cycle, causing it to be less than fully illuminated. When the brake light switch 46 is closed, the brake light bulb 50 will be fully illuminated.

Referring now to FIG. 8, an exemplary schematic of the fault indicator circuit 74 and the warning LED 76 is illustrated, together with the warning LED 76, the buffer 86, and the buffer 88. The cathode of the buffer 86 and the cathode of the buffer 88 are connected together to a first side of a resistor 162, and a second side of the resistor 162 is connected to the base of a transistor 164. The collector of the resistor 162 is connected to the anode of the warning LED 76, and the emitter of the resistor 162 is grounded. The cathode of the warning LED 76 is connected to a first side of a resistor 166, and a second side of the resistor 166 is connected to +V.

The operation of the fault indicator circuit 74 will now be briefly described. When the brake light bulb 50 is burned out, a steady high voltage signal will be provided by the brake light test and control circuit 78 through the buffer 88 to the base of the transistor 164. When the tail light bulb 52 is burned out, a pulse width modulated high voltage signal will be provided by the pulse width modulator 72 through the buffer 86 to the base of the transistor 164. When the base of the transistor 164 is high, the transistor 164 conducts, illuminating the warning LED 76. Thus, when the brake light switch 46 is closed and the brake light bulb 50 is burned out, the warning LED 76 will be lit continuously. When the running light switch 44 is closed and the tail light bulb 52 is burned out, the warning LED 76 will be illuminated by the pulse width modulated signal, causing it to be illuminated less then at full brightness. When neither the brake light bulb 50 nor the tail light bulb 52 are burned out, the warning LED 76 will not be illuminated at all.

Referring finally to FIG. 9, an exemplary schematic of the right turn signal driver circuit 82 is illustrated, together with the right rear turn signal bulb 66, the buffer 86, and the buffer 88. The doubled voltage is supplied from the voltage doubler 80 to a first side of a resistor 168, a second side of which is connected to the collector of a transistor 170 and to the gate of a MOSFET 172. The drain of the MOSFET 172 is connected to +V, and the source is connected to the non-grounded side of the right rear turn signal bulb 66.

A first side of a resistor 174 is connected to the right turn signal output of the turn signal switch 40, and a second side of the resistor 174 is connected to the anode of a diode 176 and the anode of a diode 178. The cathode of the diode 176 is connected to the input of a Schmitt hex inverter 180, a first side of a capacitor 182, and a first side of a resistor 184. A second side of the capacitor 182 and a second side of the transistor 164 are connected to ground.

The output of the Schmitt hex inverter 180 is connected to the cathode of a diode 186. The anode of the diode 186 is connected to a first side of a resistor 188 and a first side of a resistor 190. A second side of the resistor 188 is connected to a first side of a resistor 192, and to the cathode of the buffer 86 and the cathode of the buffer 88. A second side of the resistor 192 is connected to ground. A second side of the resistor 190 is connected to the cathode of the diode 186 and the input of a Schmitt hex inverter 194.

The output of the Schmitt hex inverter 194 is connected to a first side of a capacitor 196, and to the anode of a diode 198. The second side of the capacitor 196 and cathode of the diode 198 are connected to the base of the transistor 170. The emitter of the transistor 170 is grounded.

The operation of the right turn signal driver circuit 82 will now be briefly described. When the turn signal switch 40 is operated to activate the right turn signal, an alternating high and low voltage signal will be supplied to the resistor 174. The high voltage will charge the capacitor 182, bringing a high input to the Schmitt hex inverter 180 and driving its output low. When the high voltage from the turn signal switch 40 drops to zero, the only discharge path for the capacitor 182 is through the resistor 184, which is large enough to keep a high voltage on the input to the Schmitt hex inverter 180 until the turn signal switch 40 once again supplies a high voltage. Thus, as long as the turn signal switch 40 is operated to activate the right turn signal, the output of the Schmitt hex inverter 180 will be low. Conversely, when the turn signal switch 40 is not operated to activate the right turn signal, the output of the Schmitt hex inverter 180 will be high.

When the turn signal switch 40 is operated to activate the right turn signal, an alternating high and low voltage will also be supplied through the diode 178 to the input of the Schmitt hex inverter 194. When the input to the Schmitt hex inverter 194 is high, its output is low, and vice versa. When the output of the Schmitt hex inverter 194 is high, the transistor 170 is turned on, and when the output of the Schmitt hex inverter 194 is low, the transistor 170 is turned off. When the transistor 170 is turned on, the MOSFET 172 is turned off, and vice versa.

Thus, when the turn signal switch 40 produces a high voltage signal, the MOSFET 172 will be on, lighting the right rear turn signal bulb 66. When the turn signal switch 40 drops back to low voltage, the MOSFET 172 will be off, and the right rear turn signal bulb 66 will not be illuminated.

When a signal is received from the brake light test and control circuit 78 through the buffer 88 indicating that the brake light bulb 50 (shown in FIG. 1) is burned out, the voltage will provide a positive signal at the input to the Schmitt hex inverter 194, thereby causing the right rear turn signal bulb 66 to be illuminated at full intensity unless the output of the Schmitt hex inverter 180 is low, thereby indicating that the right turn signal is being operated. Thus, if the right turn signal is not being operated, the right rear turn signal bulb 66 will be illuminated at full intensity. However, if the right turn signal is being operated, the right rear turn signal bulb 66 will flash on and off (at full intensity).

Similarly, when a pulse width modulated signal is received from the pulse width modulator 72 through the buffer 86 indicating that the tail light bulb 52 (shown in FIG. 1) is burned out, the pulse width modulated voltage will provide a pulse width modulated positive signal at the input to the Schmitt hex inverter 194, thereby causing the right rear turn signal bulb 66 to be illuminated at less than full intensity unless the output of the Schmitt hex inverter 180 is low, thereby indicating that the right turn signal is being operated. Thus, if the right turn signal is not being operated, the right rear turn signal bulb 66 will be illuminated at less than full intensity. However, if the right turn signal is being operated, the right rear turn signal bulb 66 will flash on and off (at full intensity).

Although it is not shown in detail herein, the left turn signal driver circuit 84 is constructed identically to the above-detailed construction of the right turn signal driver circuit 82. In addition, the operation of the left turn signal driver circuit 84 is essentially the same as the above-detailed operation of the right turn signal driver circuit 82, differing only in that the left turn signal driver circuit 84 is operated to cause the left rear turn signal bulb 62 (shown in FIG. 1) to flash when the turn signal switch 40 is operated to select the left turn signal.

It may therefore be appreciated from the above detailed description of the preferred embodiment of the present invention that it teaches a system for providing a warning light signal visible from the rear of a motorcycle when either the brake light or the tail light of the motorcycle burn out. The warning light provided by the motorcycle rear warning light system of the present invention is highly visible, and is provided from the rear of the motorcycle so as to thereby provide following vehicles with an enhanced indication of the location of the rear of the motorcycle. Operation of the motorcycle rear warning light system of the present invention is both swift and fully automatic, and occurs immediately upon the occasion of a burned-out brake light or tail light bulb without requiring intervention of the motorcycle rider.

The motorcycle rear warning light system of the present invention is easy to install in any motorcycle's electrical system, and requires only that it be plugged into the existing system, thereby requiring no modifications to the electrical system. In the preferred embodiment, the motorcycle rear warning light system of the present invention provides a warning indication to the operator of the motorcycle to indicate that a brake light or a tail light has burned out, and that the system has operated to compensate for the burned-out bulb. The system of the present invention is even adaptable for use on other motor vehicles, such as automobiles.

The motorcycle rear warning light system of the present invention is of construction which is both durable and long lasting, and it requires little or no maintenance to be provided by the user throughout its operating lifetime. The motorcycle rear warning light system of the present invention is also of inexpensive construction, thereby enhancing its market appeal and affording it the broadest possible market. Finally, all of the aforesaid advantages and objectives of the present invention are achieved without incurring any substantial relative disadvantage.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A rear warning light system for use with a motorcycle or like motor vehicle having a rear brake light actuated by an electrical signal from a brake light switch, a rear tail light actuated by an electrical signal from a tail light switch, and rear left and right turn signal lights actuated by electrical signals from a turn signal switch, said system comprising:

a detecting circuit comprising a first current sensor for electrical connection in a series circuit with the rear tail light, said first current sensor generating a first control signal whenever it detects an open circuit condition that is a burned out rear tail light;

a second current sensor for electrical connection in a series circuit with the rear brake light, said second current sensor generating a second control signal whenever it detects an open circuit condition that is a burned out rear brake light;

a rear brake light control circuit for electrical connection to the rear brake light to selectively illuminate it, said detecting circuit being electrically connected as an input to said rear brake light control circuit, said rear brake light control circuit illuminating the rear brake light whenever the tail light switch is closed and said first current sensor generates said first control signal; and a rear turn signal control circuit for electrical connection to the rear left and right turn signal lights to selectively illuminate them, said detecting circuit and said second current sensor both being electrically connected as inputs to said rear turn signal control circuit, said rear turn signal control circuit illuminating the rear left and right turn signal lights whenever the tail light switch is closed and said first current sensor generates said first control signal, said rear turn signal control circuit illuminating the rear left and right turn signal lights whenever the brake light switch is closed and said second current sensor generates said second control signal.

2. A rear warning light system as defined in claim 1, wherein said detecting circuit provides an output when the tail light switch is closed and the rear tail light is burned out, and wherein said detecting circuit provides no output when the tail light switch is closed and the rear tail light is not burned out.

3. A rear warning light system as defined in claim 2, wherein said first current sensor provides a DC voltage as an output when the tail light switch is closed and the rear tail light is not burned out, and wherein said first current sensor does not provide the DC voltage as the output when the tail light switch is closed and the rear tail light is burned out.

4. A rear warning light system as defined in claim 3, wherein said first current sensor comprises:

a first current sense amplifier which provides the DC voltage as the output when a current is sensed in said series circuit with the rear tail light, and which does not provide the DC voltage as the output when the current is not sensed in said series circuit with the rear tail light.

5. A rear warning light system as defined in claim 4, wherein said detecting circuit additionally comprises:

a modulating circuit having said first current sense amplifier electrically connected as an input thereto, said modulating circuit does not providing said output in response to said first current sense amplifier producing the DC voltage as the output, and said modulating circuit providing a reduced average amplitude voltage in response to said first current sense amplifier does not producing said DC voltage as the output.

6. A rear warning light system as defined in claim 5, wherein said modulating circuit comprises:

an inverting pulse width modulator which produces a series of spaced-apart DC voltage pulses in response to said first current sense amplifier does not producing said DC voltage as the output, said series of spaced-apart DC voltage pulses having an average amplitude dependant on the width of the DC voltage pulses and the distance they are spaced apart, the rear brake light and the rear left and right turn signal lights being illuminated at a lowered intensity proportional to the reduction in average amplitude of said series of spaced-apart DC voltage pulses from their peak amplitude.

7. A rear warning light system as defined in claim 6, wherein the frequency of said DC voltage pulses in said series of DC voltage pulses is sufficiently fast such that when the rear brake light and the rear left and right turn signal lights are illuminated no flicker is apparent.

8. A rear warning light system as defined in claim 1, wherein the motorcycle is of the type in which the rear tail light is provided with voltage to illuminate it whenever the motorcycle is operating, wherein said rear brake light control circuit illuminates the rear brake light whenever said first current sensor generates said first control signal irrespective of whether or not the tail light switch is closed, and wherein said rear turn signal control circuit illuminates the rear left and right turn signal lights whenever said first current sensor generates said first control signal irrespective of whether or not the tail light switch is closed.

9. A rear warning light system as defined in claim 1, wherein said second current sensor provides a DC voltage as an output when the brake light switch is closed and the rear brake light is burned out, and wherein said second current sensor does not provide the DC voltage as the output when the brake light switch is closed and the rear brake light is not burned out.

10. A rear warning light system as defined in claim 9, wherein said second current sensor comprises:
a second current sense amplifier which provides the DC voltage as the output when a current is not sensed in said series circuit with the rear brake light, and which does not provide the DC voltage as the output when the current is sensed in said series circuit with the rear brake light.

11. A rear warning light system as defined in claim 1, additionally comprising:
a first electrical buffer interposed between said detecting circuit and said rear turn signal control circuit; and
a second electrical buffer interposed between said second current sensor and said rear turn signal control circuit.

12. A rear warning light system as defined in claim 11, wherein said first electrical buffer comprises:
a diode connected intermediate said detecting circuit and said rear turn signal control circuit; and wherein said second electrical buffer comprises:
a diode connected intermediate said second current sensor and said rear turn signal control circuit.

13. A rear warning light system as defined in claim 1, additionally comprising:
intensity moderating circuitry for reducing the intensity of illumination of the rear brake light due to said first current sensor generating said first control signal which the tail light switch is closed; wherein said rear brake light control circuit comprises:
rear brake light illumination circuitry for illuminating the rear brake light at full intensity whenever the brake light switch is closed.

14. A rear warning light system as defined in claim 1, wherein said rear turn signal control circuit comprises:
a rear right turn signal control circuit for operating the rear right turn signal light; and
a rear left turn signal control circuit for operating the left right turn signal light.

15. A rear warning light system as defined in claim 14, wherein said rear right turn signal control circuit comprises:
rear right turn signal illumination circuitry for causing the rear right turn signal light to be driven solely by the electrical signal from the turn signal switch whenever the turn signal switch is activated to indicate a right turn, thereby causing the rear right turn signal light to flash on and off;
and wherein said rear left turn signal control circuit comprises:
rear left right turn signal illumination circuitry for causing the left right turn signal light to be driven solely by the electrical signal from the turn signal switch whenever the turn signal switch is activated to indicate a left turn, thereby causing the left right turn signal light to flash on and off.

16. A rear warning light system as defined in claim 1, additionally comprising:
a warning light for providing an indication that the rear brake light or the rear tail light is inoperative, said warning light being illuminated either when said first current sensor generates said first control signal or when said second current sensor generates said second control signal.

17. A rear warning light system as defined in claim 16, wherein said warning light is illuminated at full intensity when the rear brake light is inoperative and at a reduced intensity when the rear tail light is inoperative.

18. A rear warning light system as defined in claim 16, wherein said warning light comprises:
an LED.

19. A rear warning light system for use with a motorcycle or like motor vehicle having a rear brake light actuated by an electrical signal from a brake light switch, a rear tail light actuated by an electrical signal from a tail light switch, and rear left and right turn signal lights actuated by electrical signals from a turn signal switch, said system comprising:
a first current sensor for electrical connection in a series circuit with the rear tail light, said first current sensor generating a first control signal whenever it detects an open circuit condition that is a burned out rear tail light;
a second current sensor for electrical connection in a series circuit with the rear brake light, said second current sensor generating a second control signal whenever it detects an open circuit condition that is a burned out rear brake light;
a rear brake light control circuit for electrical connection to the rear brake light to selectively illuminate it, said first current sensor being electrically connected as an input to said rear brake light control circuit, said rear brake light control circuit illuminating the rear brake light at a reduced intensity whenever the tail light switch is closed and said first current sensor generates said first control signal;
a rear turn signal control circuit for electrical connection to the rear left and right turn signal lights to selectively illuminate them, said first current sensor and said second current sensor both being electrically connected as inputs to said rear turn signal control circuit, said rear turn signal control circuit illuminating the rear left and right turn signal lights at a reduced intensity whenever the tail light switch is closed and said first current sensor generates said first control signal, said rear turn signal control circuit illuminating the rear left and right signal turn lights at full intensity whenever the brake light switch is closed and said second current sensor generates said second control signal, said rear turn signal control circuit operating the left and right turn signal lights to be driven solely by the electrical signal from the turn signal switch whenever the turn signal switch is activated to indicate a turn, thereby causing the selected rear turn signal light to flash on and off; and
a warning light for providing an indication that either the rear brake light or the rear tail light is inoperative, said warning light being illuminated either when said first current sensor generates said first control signal or when said second current sensor generates said second control signal.

20. A method of providing a warning signal in the event of a rear warning light failure in a motorcycle or like motor vehicle of the type having a rear brake light actuated by an electrical signal from a brake light switch, a rear tail light actuated by an electrical signal from a tail light switch, and rear left and right turn signal lights actuated by electrical signals from a turn signal switch, said method comprising:

detecting a first open circuit condition that is a burned out rear tail light with a first current sensor, said first current sensor being electrically connected in a series circuit with the rear tail light;

detecting a second open circuit condition that is a burned out rear brake light with a second current sensor, said second current sensor being electrically connected in a series circuit with the rear brake light;

selectively illuminating the rear brake light with a rear brake light control circuit, said first current sensor being electrically connected as an input to said rear brake light control circuit, said rear brake light control circuit illuminating the rear brake light whenever the tail light switch is closed and said first current sensor detects said first open circuit signal condition; and selectively illuminating the rear left and right turn signal lights with a rear turn signal control circuit, said first current sensor and said second current sensor both being electrically connected as inputs to said rear turn signal control circuit, said rear turn signal control circuit illuminating the rear left and right turn signal lights whenever the tail light switch is closed and said first current sensor detects said first open circuit condition, said rear turn signal control circuit illuminating the rear left and right turn signal lights whenever the brake light switch is closed and said second current sensor detects said second open circuit condition.

* * * * *